United States Patent [19]
Garcia, Jr. et al.

[11] Patent Number: 5,196,714
[45] Date of Patent: Mar. 23, 1993

[54] SYSTEM FOR X-Y ALIGNMENT AND TRACKING OF MOVING TARGETS HAVING ANGULAR DISPLACEMENT WITH FIBER OPTIC SENSING SURFACE

[75] Inventors: Felix Garcia, Jr., Round Rock; Rodney D. Williams, Plano, both of Tex.

[73] Assignee: Texas Instruments Incorporated, Dallas, Tex.

[21] Appl. No.: 884,296

[22] Filed: May 12, 1992

Related U.S. Application Data

[63] Continuation of Ser. No. 752,732, Aug. 8, 1991, abandoned.

[51] Int. Cl.⁵ .............................................. G01N 21/86
[52] U.S. Cl. .............................. 250/561; 250/227.31; 356/1
[58] Field of Search .................. 250/227.14, 227.31, 250/548, 561; 356/1, 4; 385/12

[56] References Cited
U.S. PATENT DOCUMENTS 4,911,527  3/1990  Garcia, Jr. et al. ............ 250/227.14
4,939,379  7/1990  Horn ...................................... 356/1

Primary Examiner—David C. Nelms
Assistant Examiner—Stephone Allen
Attorney, Agent, or Firm—Rene' E. Grossman; Richard Donaldson

[57] ABSTRACT

A system and method for X-Y alignment and tracking of moving targets having angular displacement with a fiber optic sensing surface comprising a sensor (5, 6, 17) comprising a sensing array (5) for providing an indication of the position of a beam of radiation incident on the sensing array, a radiation source for providing a beam of radiation (laser), means for simultaneously directing said beam of radiation along two separate paths (4), inhibiting circuitry for alternately inhibiting travel of the beam of radiation in each of the separate paths (13, 14), reflecting means (3, 15) in each path deflecting the beam of radiation in each path to the sensing array and responsive to the position of a beam of radiation incident on the sensing array for altering the position of the beam relative to the sensing array and circuitry responsive to the position of the beam for providing a desired object parameter indication (18, 19).

56 Claims, 3 Drawing Sheets

SYSTEM FOR X-Y ALIGNMENT AND TRACKING OF MOVING TARGETS HAVING ANGULAR DISPLACEMENT WITH FIBER OPTIC SENSING SURFACE

This application is a continuation, of application Ser. No. 07/752,732, filed Aug. 8, 1991, now abandoned.

BACKGROUND OF THE INVENTION

1. Field of the Invention

This invention relates to a system for measuring acceleration, velocity and angular displacement using a multi-layer fiber optic sensing surface.

2. Brief Description of the Prior Art

Fiber optic devices capable of indicating the position of a light beam are described in Pat. No. 4,911,527 of Garcia et al., the contents of which are incorporated herein by reference. In this patent, a fiber optic input device receives a light beam from a movable light source relative to the input device for providing input signals to a terminal. The device includes a single plane of parallel, clad optical fibers forming columns of a matrix and another similar single plane forming rows, the two planes being placed together to form the matrix. The cladding is removed from the top surface of each fiber to form a window therein to permit the light beam to directly contact the selected window in the column plane and to permit the light beam that passes the column plane optical fibers to enter the window of the row plane. Light sensors are connected to the ends of the optical fibers in both the column and row planes so that a first signal is generated indicating a column position and a second signal is generated indicating a row position, thereby fixing the intersection of the column and row optical fibers at the point where the light beam impinges. At least no more similar single vertical position plane may be positioned adjacent and below the row plane. This vertical position plane has at least no light detector connected to the ends of the optical fibers and provides a signal responsive to the light beam that passes the column and row planes indicative of the vertical position of the light source with respect to the input device.

In application Ser. No. 07/457,439 of Garcia et al., filed Dec. 27, 1989, now U.S. Pat. No. 5,085,507, the contents of which are incorporated herein by reference, there is described a device for tracking an object in three dimensional space having a fiber optic sensor array. The fiber optic sensor array comprises a row plane and a column plane each having a plurality of parallel optical fibers bonded together. A row detector is coupled to the ends of the fibers comprising the row plane. A column detector is coupled to the ends of the fibers comprising the column plane. The row and column detectors are coupled to a decoder circuit. First and second beam generators are affixed to the object and are each operable to transmit beams which terminate on the fiber optic sensor array. By determining the points of incidence of the beams, the decoder circuit determines the position of the object in three dimensions.

SUMMARY OF THE INVENTION

In accordance with the present invention, the location in three dimensions of a position in a plane of fiber optic devices is determined by triangulation of light.

Briefly, there is provided a system and method for X-Y alignment and tracking of moving targets having angular displacement with a fiber optic sensing surface comprising a sensor comprising a sensing array for providing an indication of the position of a beam of radiation incident on the sensing array, a radiation source for providing a beam of radiation, means for simultaneously directing said beam of radiation along two separate paths, inhibiting circuitry for alternately inhibiting travel of the beam of radiation in each of the separate paths, reflecting means in each path deflecting the beam of radiation in each path to the sensing array and responsive to the position of a beam of radiation incident o the sensing array for altering the position of the beam relative to the sensing array and circuitry responsive to the position of the beam for providing a desired object parameter indication.

DESCRIPTION OF THE PREFERRED EMBODIMENTS

Figure 1:
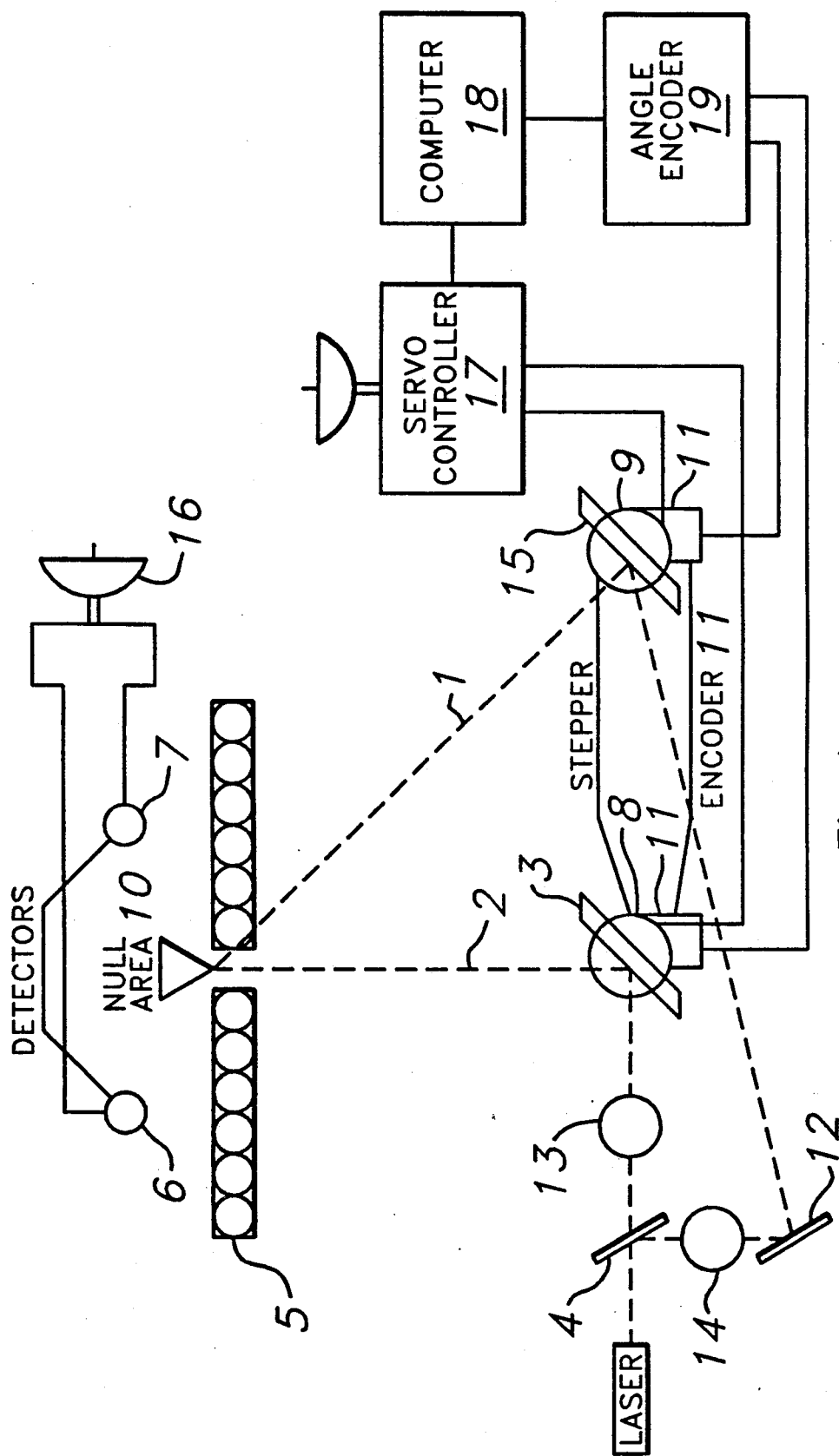
FIG. 1 is a diagram of a system for x-y alignment and tracking of moving targets having angular displacement with a fiber optic sensing surface in accordance with a first embodiment of the present invention.

Referring first to FIG. 1, there is shown a system for determining the location of a null area and properly positioning that null area. The system includes a laser which directs a light beam at a beam splitter 4 which splits the beam into a horizontal and a vertical component. The horizontal component passes through a Q-switch 13 whereas the vertical component passes through a Q-switch 14, the switches 13 and 14 being alternately in the ON or OFF condition and in opposite such conditions. The vertical light beam passing through the switch 14 is reflected from a mirror 12 to a mirror 15 which is positioned in response to a servo 9 and then as beam 1 toward a sensing surface 5. The horizontal light beam passes through the switch 13 and is reflected from a mirror 3 which is positioned in response to a servo 8 and then as beam 2 toward the sensing surface 5. Since the switches 13 and 14 are alternately ON and OFF and in opposite states, only one of the beams 1 and 2 will impinge upon the sensing surface 5 at one time.

Sensors 6 or 7 detect the beams 1 or 2 and provide either a positive or negative output to indicated upon which of sensors 6 or 7 the beam 1 or 2 impinged. This positive or negative output is transmitted via transmitter/receiver 16 to a servo controller 17 which controls the servos 8 and 9 via encoders 11 to control the positions of the mirrors 3 and 15. Control of the servo controller 17 can also be responsive to a computer 18 which communicates with the serve controller. The computer 18 can compensate for any nonlinearities in the control dynamics by on-line real time compensation. The computer 18 serves to actuate the servo electronics to maintain both beams 1 and 2 on the null area 10. By knowing the servo angles 8 and 9, the distance to the surfaces can be calculated. As the sensing surface 5 moves relative to the light beams 1 and 2, a tracking effect occurs, making the mirrors 3 and 15 move independently relative to the sensing surface, maintaining the beams 1 and 2 fixed on the null area 10 of the sensing surface while encoders 11 provide mirror displacement output data to an angle encoder 19. The sensing surface 5 and mirrors 3 and 15 form a triangle. Angles and rate of mirror movement is always known by the encoders 11 and angle encoder 19 so that the range, acceleration, velocity and angular displacement of the sensing surface as well as any other required calculations from the data provided by the angle encoded can be made in known manner by the computer 18. The resolution of the measurements is determined by the fiber and beam diameters.

Figure 2:
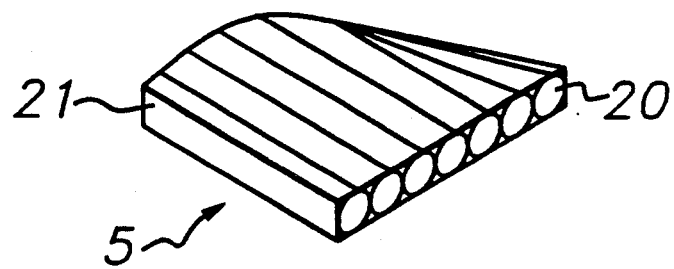
FIG. 2 is a diagram of a sensing surface as used in conjunction with the embodiment of FIG. 1.
Figure 3:
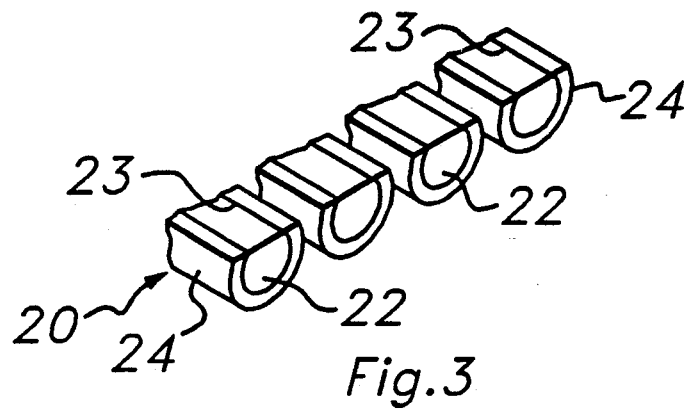
FIG. 3 is a perspective view of the fibers of the sensing surface of FIG. 2.

The sensing surface 5, as shown in FIG. 2, is composed of a single layer 21 of straight parallel fiber optic elements 20. As shown in FIG. 3, each fiber optic element 20 is composed of an optical fiber 22 which has a window 23 formed therein by removing the bottom surface of cladding 24 to expose the actual optical fiber 22. The windows are positioned in the sensing surface 5 in a downward direction or toward the light beams 1 and 2. The optical fibers will hereinafter be described as circles though it should be understood that they are correctly depicted as shown and described with respect to FIG. 3.

In operation, the light from the laser will travel through the beam splitter and then alternately travel through the switches 13 and 14 and via controllable mirror 3 in the case of beam 1 and mirror 12 and controllable mirror 9 in the case of beam 2 toward the sensing surface 5. The beams 1 and 2 will either move under control of the encoders 11 and servos 8 and 9 to track movement of the null area 10 in the sensing surface 5 if the sensing surface is moving or will move to locate the position of the null area if the sensing surface is stationary. The position of each of the beams 1 and 2 as well as any changes and rates of change thereof are determined in the computer 18 since the instantaneous position of each mirror is available from the encoder 11 associated therewith which position is constantly provided at the angle encoder 19.

More specifically, if the light beam 1 is not at the null area 10 it will strike one of the optical fiber elements 20 and travel therealong to a detector 6 or 7 unique to that fiber optic element, thereby indicating the direction and extent of offset from the null area 10. A signal indicative thereof is provided by the detector 6 or 7 and transmitted to the servo controller 17 which, under control of the computer 18, controls the encoder 11 associated with the mirror 15 being sensed and moves that mirror so that the beam 1 reflected therefrom is moved toward the null area 10.

The light beam 2 is then directed toward the sensing surface with the light beam off due to change in the condition of switches 13 and 14. If the light beam 2 is not at the null area 10 it will strike one of the optical fiber elements 20 and travel therealong to a detector 6 or 7 unique to that fiber optic element, thereby indicating the direction and extent of offset from the null area 10. A signal indicative thereof is provided by the detector 6 or 7 and transmitted to the servo controller 17 which, under control of the computer 18, controls the encoder 11 associated with the mirror 3 and moves that mirror so that the beam 2 reflected therefrom is moved toward the null area 10.

As is well known, in standard manner, the position, acceleration, velocity and angular displacement of the null area 10 can be determined by the computer via the angular encoder 19 from the data received thereat from the encoders 11.

Figure 4:
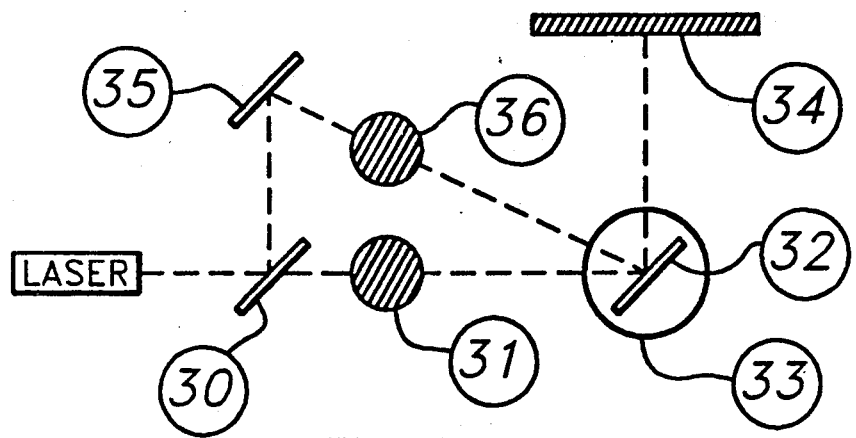
FIG. 4 is a diagram of a second embodiment of a system as in FIG. 1.

Referring now to FIG. 4, there is shown a second embodiment of the invention. In accordance with this embodiment, both light beams and 2 are directed from the same mirror. The system includes a laser which provides a light beam, this light beam being split into a vertical and a horizontal path by beam splitter 30. The horizontal beam passes through Q-switch 31 to a mirror 32 controlled by a serve and encoder 33 which directs the beam toward the sensing surface 34 which is the same as the sensing surface 5 of FIG. 1. The vertical light path is deflected by stationary mirror 35 and then passes through Q-switch 36 to the mirror 32. The Q-switches 31 and 36 are alternately ON and OFF, one being ON when the other is OFF as in the first embodiment. Therefore light from only one of the vertical and horizontal paths strikes the sensing surface 34 at any time. The remainder of the system is identical to that of FIG. 1 in that the same detectors 6, servo controller 17, computer 18 and angle encoder 19 are utilized in the same manner.

Figure 6:
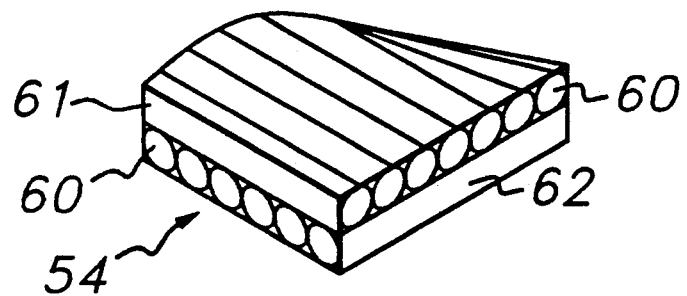
FIG. 6 is a diagram of a sensing surface as used in conjunction with the embodiment of FIG. 5.
Figure 5:
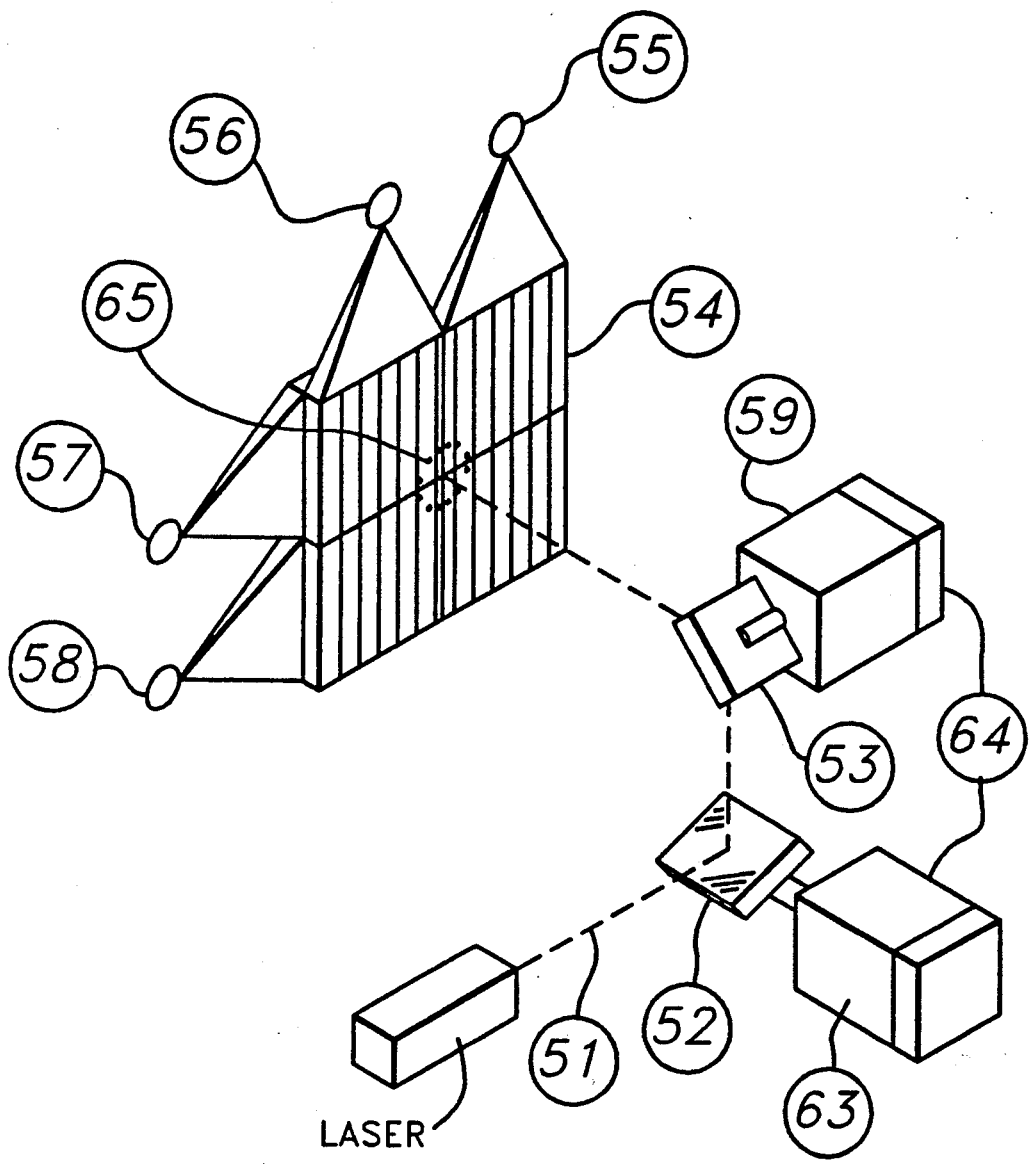
FIG. 5 is a diagram of a third embodiment of a system as in FIG. 1.

Referring now to FIG. 5, there is shown a third embodiment of the invention. The sensing surface 54 comprises two layers rather than one as best shown in FIG. 6. The sensing surface 54 is composed of a column plane 61 and a row plane 62 as in the above noted Pat. No 4,911,527. The optical fiber elements 60 all have windows formed by removing cladding at the lower surface thereof to expose the actual optical fiber, such as is shown in FIG. 3. The optical fiber elements 60 in each column plane 61 are spaced apart so that light impinging thereon also travels therearound to the optical fiber in the row plane 62 therebelow with the light traveling down one of the optical fiber elements 60 in each of the row and column planes. The light is detected at the end of each column and row fiber to provide an indication of the x-y position of the light impinging upon the sensing surface 54 as will be explained hereinbelow.

As can be seen in FIG. 5, the laser provides a light beam 51 which is deflected by the adjustable mirrors 52 and 53 onto the two layer sensing surface 54. The optical fiber elements 60 of the column plane 61 are coupled to sensors 55 and 56 whereas the optical fiber elements 60 of the row plane 62 are coupled to sensors 57 and 58, the sensors 55 and 56 operating in identical manner to the sensors 6 and 7 of FIG. 1 in conjunction with the column plane and the sensor 57 and 58 operating in identical manner to the sensors 6 and 7 in conjunction with the row plane. These sensors control servo motors 59 and 63 which control the positions of mirrors 53 and 52 respectively in standard manner by sending signals therefrom to encoders 64 which control the servo motors. This causes the mirrors 52 and 53 to respond independently and maintain the beam 51 fixed on the null area shown by the dotted area 65 of the sensing surface 54. By the use of the two layer sensing surface, both x and y or two dimensional data is obtained to permit movement of the beam 51 in two dimensions rather than only along one line as in the embodiments of FIGS. to 4. Communication between the sensors 55 to 58 and the encoders and servos 59, 63 and 64 and all calculations are the same as set forth in conjunction with the embodiment of FIG. 1.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

We claim:
1. A system for tracking a parameter of an object comprising:
    (a) a sensor comprising a sensing array for providing an indication of the position of a beam of radiation incident on said sensing array;
    (b) a radiation source for providing a beam of radiation,
    (c) means for simultaneously directing said beam of radiation along two separate paths;
    (d) inhibiting circuitry for alternately inhibiting travel of said beam of radiation in each of said separate paths;
    (e) reflecting means in each of said separate paths deflecting said beam of radiation in each of said separate paths to said sensing array and responsive to the position of a beam of radiation incident on said sensing array for altering the position of said beam relative to said sensing array; and
    (f) circuitry responsive to the position of said beam for providing a desired object parameter indication.

2. A system as set forth in claim 1 wherein said sensor comprises a fiber optic sensing array comprising said sensing array and detection circuitry coupled to said sensing array and said reflecting means for controlling said reflecting means.

3. A system as set forth in claim 1 wherein said inhibiting circuitry is a Q-switch.

4. A system as set forth in claim 1 wherein said sensor comprises a fiber optic sensing array comprising said sensing array, said fiber optic sensing array comprising column optical fibers including a plurality of spaced apart, parallel, clad optical fibers in a single plane forming column of a matrix, having a longitudinal section of the cladding removed from an exposed surface of each fiber, forming a first window therein, to permit the light beam to directly contact the column optical fibers and to be conducted therein; row optical fibers, including a plurality of parallel clad optical fibers in a single plane forming rows of a matrix, having a longitudinal section of the cladding removed from the surface portion of each fiber facing said column to form a second window therein, the row optical fibers being positioned adjacent and below the column optical fibers with the rows orthogonal to the columns to form a matrix, the second windows receiving that part o the light beam that passes between the column optical fiber, to be conducted therein and column and row detecting circuitry coupled to said sensing array and said reflecting means for controlling said reflecting means.

5. A system as set forth in claim 1 wherein said reflecting means comprises a mirror and a servo responsive to the position of said beam of radiation incident on said sensing array for altering the position of said mirror.

6. A system as set forth in claim 5 wherein said sensor comprises a fiber optic sensing array comprising said sensing array, said fiber optic sensing array comprising column optical fibers including a plurality of spaced apart, parallel, clad optical fibers in a single plane forming column of a matrix, having a longitudinal section of the cladding removed from an exposed surface of each fiber, forming a first window therein, to permit the light beam to directly contact the column optical fibers and to be conducted therein; row optical fibers, including a plurality of parallel clad optical fibers in a single plane forming rows of a matrix, having a longitudinal section of the cladding removed from the surface portion of each fiber facing said column to form a second window therein, the row optical fibers being positioned adjacent and below the column optical fibers with the rows orthogonal to the columns to form a matrix, the second windows receiving that pat of the high beam that passes between the column optical fiber, to be conducted therein and column and row detection circuitry coupled to said sensing array and said reflecting means for controlling said reflecting means.

7. A system as set forth in claim 1 wherein said reflecting means comprises a separate mirror in each of said separate paths and a separate servo associated with each of said mirrors responsive to the position of a beam of radiation from one of said mirrors incident on said ensign array for altering the position of said one mirror.

8. A system as set forth in claim 7 wherein said sensor comprises a fiber optic sensing array comprising said sensing array, said fiber optic sensing array comprising column optical fibers including actuality of spaced apart, parallel, clad optical fibers in a single plane forming column of a matrix, having a longitudinal section o the cladding removed from an exposed surface of each fiber, forming a first window therein, to permit the light beam to directly contact the column optical fibers and to be conducted therein; row optical fibers, including plurality of parallel clad optical fibers in a single plane forming rows of a matrix, having a longitudinal section of the cladding removed from the surface portion of each fiber facing said column to form a second window therein, the row optical fibers being positioned adjacent and below the column optical fibers with the rows orthogonal to the columns to form a matrix, the second windows receiving that part of the light beam that passes between the column optical fibers, to the conducted therein and column and row detection circuitry coupled to said sensing array and said reflecting means for controlling said reflecting means.

9. A system as set forth in claim 1 wherein said radiation source is light.

10. A system as set forth in claim 9 wherein said sensor comprises a fiber optic sensing array comprising said sensing array and detection circuitry coupled to said sensing array and said reflecting mean for controlling said reflecting means.

11. A system as set forth in claim 9 wherein said inhibiting circuitry is a Q-switch.

12. A system as set forth in claim 9 wherein said senor comprises a fiber optic sensing array comprising said sensing array, said fiber optic sensing array comprising column optical fibers including a plurality of sapced apart, parallel, clad optical fibers in a single plane forming column of a matrix, having a longitudinal section of the cladding removed from an exposed surface of each fiber, forming a first window therein, to permit the light beam to directly contact the column optical fibers and to be conducted therein; row optical fibers, including 'of parallel clad optical fibers in a single plane forming rows of a matrix, having a longitudinal section of the cladding removed from the surface portion of each fiber facing said column to form a second window therein, the row optical fibbers being positioned adjacent and below the column optical fibers with the rows orthogonal to the columns to form a matrix, the second windows receiving that part o the light beam that passes between the column optical fiber, to be conducted therein and column and row detection circuitry coupled to said sensing array and said reflecting means for controlling said reflecting means.

13. A system as set forth in claim 9 wherein said reflecting means comprises a mirror and a servo responsive to the position of said beam o radiation incident on said sensing array for alerting the position of said mirror.

14. A system as set forth in claim 13 wherein said sensor comprises a fiber optic sensing array comprising said sensing array, said fiber optic sensing array comprising column optical fibers including 'of spaced apart, parallel, clad optical fibers in a single plane forming column of a matrix, having a longitudinal section of the cladding removed from an exposed surface of each fiber, forming a first window therein, to permit the light beam to directly contact the column optical fibers and to be conducted therein; row optical fibers, including a plurality of parallel clade optical fibers in a single plane forming rows of a matrix, having a longitudinal section of the cladding removed from the surface portion of each fiber facing said column of form a second window therein, the row optical fibers being positioned adjacent and below the column optical fibers with the rows orthogonal to the columns o form a matrix, the second windows receiving that part of the light beam that passes between the column optical fibers, to be conducted therein and column and row detection circuitry coupled to said sensing array and said reflecting mean for controlling said reflecting means.

15. A system as set forth in claim 9 wherein said reflecting means comprises a separate mirror in each of said separate paths and a separate servo associated with each of said mirrors responsive to the position of a beam of radiation from one of said mirrors incident on said sensing array for altering the position of said one mirror.

16. A system as set forth in claim 15 wherein said sensor comprises a fiber optic sensing array comprising said sensing array, said fiber optic sensing array comprising column optical fibers including a plurality of spaced apart, parallel, clad optical fibers in a single plane forming column of a matrix, having a longitudinal section of the cladding removed from an exposed surface of each fiber, forming a first window therein, to permit the light beam to directly contact the column optical fibers and to be conducted therein; row optical fibers, including a plurality of parallel clad optical fibers in a single plane forming rows of a matrix, having a longitudinal section of the cladding removed from the surface portion of each fiber facing said column to form a second window therein, the row optical fibers being positioned adjacent and below the column optical fibers with the rows orthogonal to the columns to form a matrix, the second windows receiving that part of the light beam that passes between the column optical fiber, to be conducted therein and column and row detection circuitry coupled to said sensing array and said reflecting means for controlling said reflecting means.

17. A method of tracking a parameter of an object comprising the steps of:

(a) providing a sensor comprising a sensing array for providing an indication of the position of a beam of radiation incident on said sensing array;

(b) providing a radiation source for providing a beam of radiation;

(c) simultaneously directing said beam of radiation along two separate paths;

(d) alternately inhibiting travel of said beam of radiation in each of said separate paths;

(e) deflecting said beam of radiation in each of said separate paths to said sensing array and responsive to the position of a beam of radiation incident o said sensing array for altering the position of said beam relative to said sensing array; and (f) providing a desired object parameter indication responsive to the position of said beam.

18. A method as set forth in claim 17 wherein said sensor comprises a fiber optic sensing array comprising said sensing array, said fiber optic sensing array comprising column optical fibers including a plurality of spaced apart, parallel, clad optical fibers in a single plane forming column of a matrix, having a longitudinal section of the cladding removed from an exposed surface of each fiber, forming a first window therein, to permit the light beam to directly contact the column optical fibers and to be conducted therein; row optical fibers, including a plurality of parallel clad optical fibers in a single plane forming rows of a matrix, having a longitudinal section of the cladding removed from the surface portion of each fiber facing said column to form a second window therein, the row optical fibers being positioned adjacent and below the column optical fibers with the rows orthogonal to the columns to form a matrix, the second windows receiving that part of the light beam that passes between the column optical fiber, to be conducted therein and column and row detection circuitry coupled to said sensing array and said reflecting means for controlling said reflecting means.

19. A method as set forth in claim 17 wherein said radiation source is light.

20. A method as set forth in claim 19 wherein said sensor comprises a fiber optic sensing array comprising said sensing array, said fiber optic sensing array comprising column optical fibers including a plurality of spaced apart, parallel, clad optical fibers in a single plane forming column of a matrix, having a longitudinal section of the cladding removed from an exposed surface of each fiber, forming a first window therein, to permit the light beam to directly contact the column optical fibers and to be conducted therein; row optical fibers, including a plurality of parallel clad optical fibers in a single plane forming rows of a matrix, having a longitudinal section of the cladding removed from the surface portion of each fiber facing said column to form a second window therein, the row optical fibers being positioned adjacent and below the column optical fibers with the rows orthogonal to the columns to form a matrix, the second windows receiving that part of the light beam that passes between the column optical fiber, to be conducted therein and column and row detection circuitry coupled to said sensing array and said reflecting means for controlling said reflecting means.

21. A method as set forth in claim 17 wherein said sensor comprises a fiber optical sensing array comprising said sensing array and detection circuitry coupled to said sensing array and said reflecting means for controlling said reflecting means.

22. A method as set forth in claim 21 wherein said sensor comprises a fiber optic sensing array comprising said sensing array, said fiber optic sensing array comprising column optical fibers including a plurality of spaced apart, parallel, clad optical fibers in a single plane forming column of a matrix, having a longitudinal section of the cladding removed from an exposed surface of each fiber, forming a first window therein, to permit the light beam to directly contact the column optical fibers and to be conducted therein; row optical fibers, including a plurality of parallel clad optical fibers in a single plane forming rows of a matrix, having a longitudinal section of the cladding removed from the surface portion of each fiber facing said column to form a second window therein, the row optical fibers being positioned adjacent and below the column optical fibers with the rows orthogonal to the columns to form a matrix, the second windows receiving that part of the light beam that passes between the column optical fiber, to be conducted therein and column and row detection circuitry coupled to said sensing array and said reflecting means for controlling said reflecting means.

23. A method as set forth in claim 19 wherein said sensor comprises a fiber optic sensing array comprising said sensing array and detection circuitry coupled to said sensing array and said reflecting means for controlling said reflecting means.

24. A method as set forth in claim 23 wherein said sensor comprises a fiber optic sensing array comprising said sensing array, said fiber optic sensing array comprising column optical fibers including a plurality of spaced apart, parallel, clad optical fibers in a single plane forming column of a matrix, having a longitudinal section of the cladding removed from an exposed surface of each fiber, forming a first window therein, to permit the light beam to directly contact the column optical fibers and to be conducted therein; row optical fibers, including a plurality of parallel clad optical fibers in a single plane forming rows of a matrix, having a longitudinal section of the cladding removed from the surface portion of each fiber facing said column to form a second window therein, the row optical fibers being positioned adjacent and below the column optical fibers with the rows orthogonal to the columns to form a matrix, the second windows receiving that part of the light beam that passes between the column optical fiber, to be conducted therein and column and row detection circuitry coupled to said sensing array and said reflecting mean for controlling said reflecting means.

25. A system for tracking a parameter of an object comprising:
(a) a sensor comprising a sensing array for providing an indication of the position of a beam of radiation incident on said sensing array;
(b) a radiation source for providing a beam of radiation;
(c) inhibiting circuitry for alternately inhibiting travel of said beam of radiation in each of two separate paths;
(d) reflecting means in each of said separate paths deflecting said beam of radiation in each of said separate paths to said sensing array and responsive to the position of a beam of radiation incident on said sensing array for altering the position of said beam relative to said sensing array; and
(e) circuitry responsive to the position of said beam for providing a desired object parameter indication.

26. The system as set forth in claim 25 wherein said radiation source is light.

27. The system as set forth in claim 25 wherein said sensor comprises a fiber optic sensing array comprising said sensing array and detection circuitry coupled to said sensing array.

28. The system as set forth in claim 25 wherein said inhibiting circuitry is a Q-switch.

29. The system as set forth in claim 25 wherein said reflecting means comprises a mirror and a servo responsive to the position of said beam of radiation incident on said sensing array for altering the position of said mirror.

30. The system as set forth in claim 25 wherein said reflecting means comprises a separate mirror in each of said separate paths and a separate servo associated with each of said mirrors responsive to the position of a beam of radiation from one of said mirrors incident on said sensing array for altering the position of said one mirror.

31. A system for tracking a parameter of an object comprising:
(a) a sensor for providing an indication of the position of a beam of radiation incident on said sensor;
(b) a radiation source for providing a beam o radiation;
(c) inhibiting circuitry for alternately inhibiting travel of said beam of radiation in each of two separate paths; and
(d) circuitry responsive to the position of said beam for providing a desired object parameter indication.

32. The system as set forth in claim 31 wherein said radiation source is light.

33. The system as st forth in claim 31 wherein said sensor comprises a sensing array.

34. The system as set forth in claim 31 wherein said sensor comprises a fiber optic sensing array comprising a sensing array and detection circuitry coupled to said sensing array.

35. The system as set forth in claim 31 wherein said inhibiting circuitry is a Q-switch.

36. The system of claim 31 further including a reflecting means in each of said separate paths deflecting said beam of radiation on each of said separate paths to said sensor and responsive to the position of a beam of radiation incident on said sensor for altering the position of said beam relative to said sensor.

37. The system as set forth in claim 36 wherein said reflecting means comprises a mirror and a servo responsive to the position of said beam of radiation incident on said senor for altering the position of said mirror.

38. The system as set forth in claim 36 wherein said reflecting means comprises a separate mirror in each of said separate paths and a separate servo associated with each of said mirrors responsive to the position of a beam of radiation from one of said mirrors incident on said sensor for altering the position of said one mirror.

39. A system for tracking a parameter of an object comprising:
(a) a radiation source for providing a beam of radiation;
(b) inhibiting circuitry for alternately inhibiting travel of said beam of radiation in each of two separate paths;
(c) reflecting means in each of said separate paths deflecting said beam of radiation in each of said separate paths to a sensor and responsive to the position of a beam of radiation incident on said sensor altering the position of said beam relative to said sensor; and (d) circuitry responsive to the position of said beam for providing a desired object parameter indication.

40. The system as set forth in claim 30 wherein said radiation source is light.

41. The system as set forth in claim 390 wherein said inhibiting circuitry is a Q-switch.

42. The system of claim 39 further wherein said reflecting means comprises a mirror and a servo responsive to the position of said beam of radiation incident on said sensor for altering the position of said mirror.

43. The system as set forth in claim 39 wherein said reflecting means comprises a separate mirror in each of said separate paths and a separate servo associated with each of said mirrors responsive to the position of a beam of radiation from one of said mirrors incident on said sensor for altering the position of said one mirror.

44. The system as set forth in claim 39 wherein said sensor comprises a sensin array.

45. The systems as set forth in claim 39 wherein said sensor comprises a fiber optic sensing array comprising a sensing array and detection circuitry coupled to said sensing array.

46. A method of tracking a parameter of an object comprising the steps of:
(a) providing a sensor for providing an indication of the position of a beam of radiation incident on said sensor;
(b) providing a radiation source for providing a beam of radiation;
(c) alternately inhibiting travel of said beam of radiation in each of two separate paths; and
(d) providing a desired object parameter indication responsive to the position of said beam.

47. The method as set forth in claim 46 wherein said radiation source is light.

48. The method as set forth in claim 46 wherein said sensor comprises a sensing array.

49. The method as set forth in claim 46 wherein said sensor comprises a fiber optic sensing array comprising said sensing array and detection circuitry coupled to said sensing array.

50. The method as set forth in claim 46 wherein said inhibiting circuitry is a Q-switch.

51. The method of claim 46 further including a step of deflecting said beam of radiation in each of said separate paths to said sensor ad responsive to the position of beam of radiation incident on said sensor altering the position of said beam relative to said sensor.

52. A method of tracking a parameter of an object comprising the steps of:
(a) providing a radiation source for providing a beam of radiation;
(b) alternately inhibiting travel of said beam of radiation in each of two separate paths;
(c) deflecting said beam of radiation in each of said separate paths to a sensor and responsive to the position of a beam of radiation incident on said sensor for altering the position of said beam relative to said sensor; and
(d) providing a desired object parameter indication responsive to the position of said beam.

53. The method as set forth in claim 52 wherein said radiation source is light.

54. The method as set forth in claim 52 wherein said inhibiting circuitry is a Q-switch.

55. The method as set forth in claim 52 wherein said sensor comprises a sensing array.

56. The method as set forth in claim 52 wherein said sensor comprises a fiber optic sensing array comprising said sensing array and detection circuitry coupled to said sensing array.

* * * * *